Sept. 9, 1941.   F. O. GRAHAM   2,255,420
FAN DRIVE AND THE LIKE
Filed Nov. 23, 1938
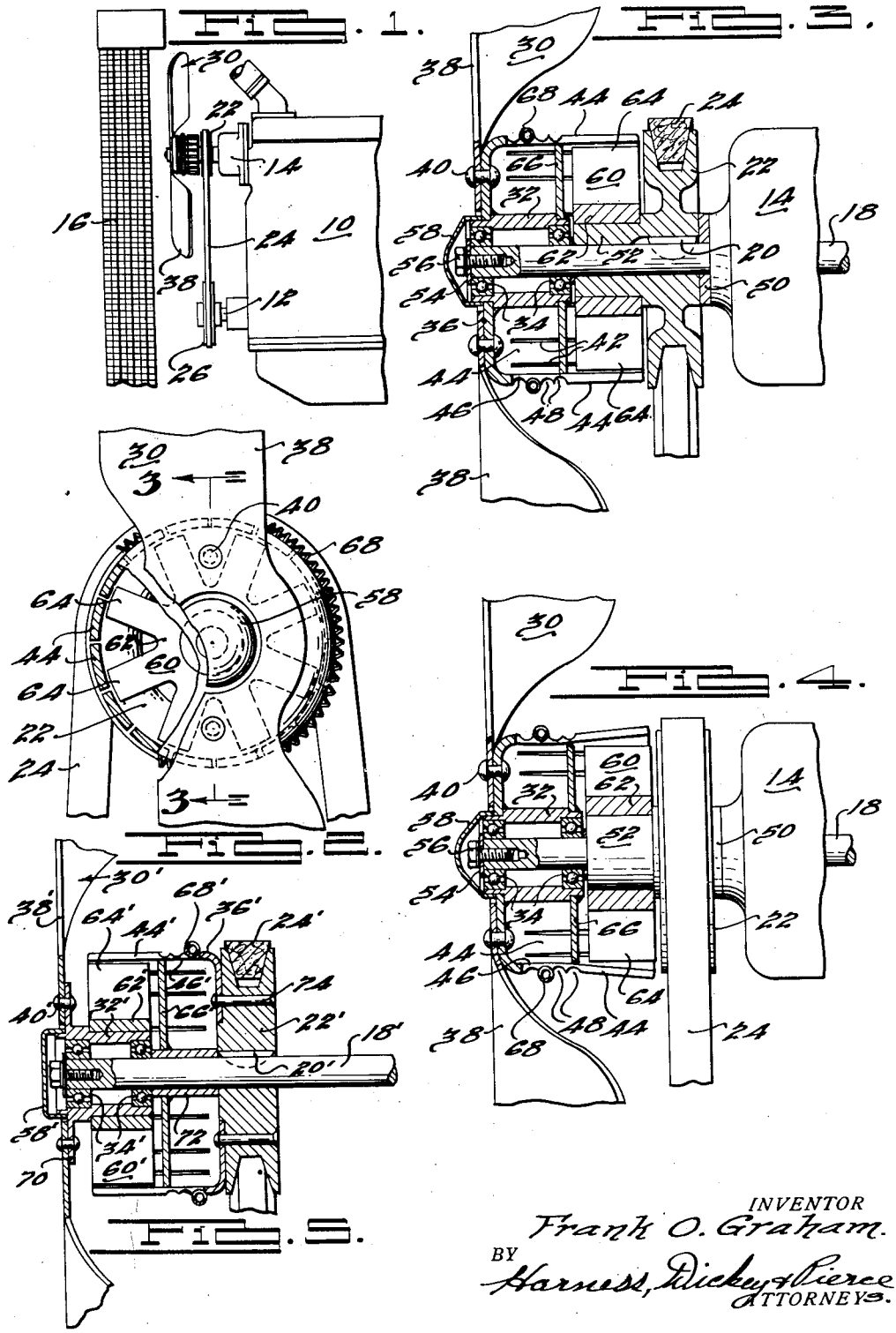
INVENTOR
Frank O. Graham.
BY Harness, Dickey & Pierce
ATTORNEYS Patented Sept. 9, 1941

2,255,420

UNITED STATES PATENT OFFICE 2,255,420

FAN DRIVE AND THE LIKE

Frank O. Graham, Detroit, Mich., assignor of one-third to Grayston R. Ohmart, Detroit, Mich.

Application November 23, 1938, Serial No. 241,924

1 Claim. (Cl. 123—171)

This invention relates to power transmitting mechanism and particularly to such mechanism in which the driving member rotates at variable rates of speed and the speed of the driven member automatically corresponds to that of the driving member over certain range of speeds only of the driving member and varies therefrom at other rotational speeds of the driving member, the principal object being the provision of a device of the type described that is simple in construction, efficient in operation and economical to produce.

Objects of the invention include the provision of power transmitting mechanism including driving and driven members devoid of frictional or mechanical interengagement, so constructed and arranged that the driven member will rotate at substantially the same speed of rotation as the driving member over the lower ranges of speed of the driving member and will automatically rotate at a speed less than the speed of the driving member over higher ranges of speed of the driving member; the provision of a construction as above described in which the speed of rotation of the driven member will approximately correspond to that of the driving member over the lower ranges of speed of the driving member and will rotate at an approximately constant speed when the speed of the driving member exceeds such lower ranges of speed; the provision of a construction as above described in which the speed of rotation of the driven member will increase with increase of speed of the driving member over lower ranges of speed of the driving member and will decrease during increased rotational speeds of the driving member above said lower ranges of speed thereof; the provision of a power transmitting mechanism as above described in which one of the rotating members includes a permanently magnetized element and the other of the rotating members includes a magnetizable element, the members being so constructed and arranged as to increase the air gap between them during increase in speed of the driving member over at least a portion of the range of speed thereof.

Other objects of the invention are the provision of a power transmitting mechanism including a pair of rotatable members one radially embraced within the other and so constructed and arranged as to cause a magnetic drag between them, the outer of said members being so constructed and arranged as to yield at least in part in a radially outwardly direction during increase in the rate of rotational movement thereof whereby to increase the air gap between it and the other of said members to reduce the magnetic drag between them; the provision of a construction as above described in which the outer of the said members is of approximately cup-shaped formation the side walls of which are slotted to form radially resilient finger portions or segments peripherally embracing the other of the members, the radially resilient portions adapted to yield in a radially outwardly direction under the influence of centrifugal force set up by rotation of the cup-shaped member thereby to increase the air gap between it and the member braced thereby; the provision of a construction as above described together with means for modifying the yielding characteristics of the yieldable fingers or segments; the provision of a construction as above described in which the cup-shaped member is associated with the driven member; and the provision of a construction as above described in which the cup-shaped member is associated with the driving member.

Further objects of the invention include the provision of a drive for the fan of an automotive vehicle whereby the fan will be driven at a speed proportional to the speed of the engine over the lower ranges of engine speed and its relative speed of rotation as compared to that of the engine will decrease as the speed of the engine increases beyond said lower ranges of speed; the provision of a drive for the fan of an automotive vehicle from the engine thereof including a pair of relatively movable parts devoid of frictional or mechanical interconnection so constructed and arranged as to limit the maximum rate of rotation of the fan and to automatically limit the application of power tending to rotate the fan beyond a predetermined rate of rotation of the driven member; the provision of a drive for the fan of an automotive vehicle from the engine thereof so constructed and arranged as to eliminate the relatively great power loss present in conventional constructions due to the necessity of rotating the fan at relatively high rates of speed corresponding with the higher ranges of speed of the engine; and the provision of a construction for driving the fan of an automotive vehicle from the engine thereof which will eliminate the objectionable noises attendant to rotation of such fan at high engine speeds in conventional constructions.

The above being among the objects of the present invention the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a more or less diagrammatic fragmentary side elevational view of the engine and radiator of a conventional internal combustion engine driven automotive vehicle, illustrating a fan drive therefor constructed in accordance with the present invention;

Fig. 2 is a partially broken, partially sectioned, fragmentary, enlarged front elevational view of the fan shown in Fig. 1, together with the drive therefor;

Fig. 3 is a vertical sectional view taken on the line 3—3 of Fig. 2 and illustrating the relation of the various parts when at rest;

Fig. 4 is a view similar to that shown in Fig. 3 except that the parts are illustrated in a position they may assume during higher ranges of rotational speed; and, Fig. 5 is a view similar to Fig. 3 showing the various parts at rest in a modified form of construction.

Although mechanism constructed in accordance with the present invention is applicable for use wherever it is desired to drive one member from another and to limit the maximum speed of rotation at which the driven member may be rotated regardless of speeds of rotation of the driving member in excess thereof, it is particularly adaptable for use as a driving connection between the cooling fan of an automotive vehicle and the engine therefor from which it is driven. Accordingly, for the purpose of simplicity in the disclosure of the present invention, reference will hereinafter be made only to embodiments thereof suitable for use as the fan drive of a motor vehicle, its application to other uses thus being made apparent to those skilled in the art.

In the present state of the art, the fans commercially used in connection with automotive cooling systems are driven, by means of belts, directly from the cooperating engine crank shaft and the speed of the fan bears a fixed relation with respect to the speed of the engine. The fan is an essential part of automotive cooling systems only during such times as when idling the engine or when the vehicle is being driven at relatively low speeds. When the vehicle is being driven at a moderate rate of speed or at a higher speed up to its maximum, the motion of the vehicle results in an adequate supply of air flowing through the radiator of the cooling system without the aid of the fan. The power required to drive a propeller type of fan such as is commonly used on automotive cooling systems varies, theoretically, as the cube of the fan speed. It becomes readily apparent that in the higher ranges of vehicle speeds the speed of the fan, and, therefore, the power necessary to drive it, increases far beyond any requirements of the fan to deliver air through the radiator. In the present commonly accepted construction for automotive fan drives, the disadvantages are that the overall efficiency of the power plant of the vehicle is lowered at times when it is most needed, the unnecessarily high speed of the fan causes objectionable noises at the higher car speeds, and heavier belts are required to transmit the increased but unnecessary power to the fan.

The desirability of discontinuing rotation of the fan of an automotive vehicle above a predetermined engine speed, or the limiting of the speed of rotation of the fan to a predetermined maximum less than the corresponding maximum possible speed of the engine, has heretofore been recognized. However, as far as I am aware no construction has heretofore been suggested that is commercially practicable, the constructions heretofore proposed being open to the objection of either being unduly expensive, subject to rapid wear or deterioration, unduly complicated and/or inefficient for the purpose desired. The present invention provides apparatus admirably suited to attain the desired results above mentioned in an extremely simple and efficient manner, resulting in apparatus that is simple in construction and economical to produce, and that will remain substantially devoid of wear and operative under most adverse conditions of operation for a substantially indefinite time period.

In accordance with the present invention the fan is driven through a magnetic power transmitting device. This device may be interposed at any point in the line of connection between the rotating part of the engine and the fan but inasmuch as it lends itself to ready application to at least part of the hub of the fan it is preferably employed at this point and is so shown in the drawing as a matter of illustration only.

This power transmitting mechanism includes two independently rotatable members or elements, one of which is radially embraced by the other. One of the elements is or includes a permanently magnetized element and the other thereof is or includes a magnetically attractable part. The radially outer of such members is so constructed and arranged as to be of a radially yieldable nature, yieldable under the influences of the centrifugal forces to which it is subjected during rotation, and in yielding acting to increase the air gap between the two members whereby to lessen the magnetic drag of one upon the other. In this manner, by reducing the magnetic drag of one of the members upon the other through radial yielding of the outer of the members, a construction may be designed such that when the speed of rotation of the fan reaches a predetermined maximum speed, substantially no increase in the speed thereof will occur despite continued increases in speed of the engine itself.

Referring now to the accompanying drawing and particularly to Fig. 1 the numeral 10 indicates generally an internal combustion engine, in this case assumed to be the power plant of a motor vehicle, having a crankshaft 12 projecting from the forward end thereof and a water pump 14 mounted in a conventional manner with respect to the forward face thereof. Positioned in suitably spaced relation to the forward face of the engine 10 is the conventional cooling radiator 16 which is assumed to be suitably connected into the conventional cooling water circulating system for the engine 10 in a conventional manner.

As best shown in Fig. 3, the water pump 14 is provided with a drive shaft 18 suitably supported therein for rotational movement and the drive shaft 18 projects forwardly from the pump 14. Immediately forwardly of the pump 14, the shaft 18 has fixed thereto, as by means of a key 20, a plate 22, the periphery of which is grooved to receive a so-called V-belt 24 therein. The forwardly projecting end of the crankshaft 12 is provided with a similar pulley 26 over which the belt 24 is also trained whereby the pulley 22 and consequently the shaft 18 is caused to rotate at all times at a fixed ratio to the speed of rotation of the crankshaft 12. A fan, indicated generally at 30, is mounted upon the forward end of the shaft 18. The arrangement thus far described is conventional in all respects. In conventional practice, however, the fan 30 is fixed with respect to the forward end of the shaft 18 so as to rotate at all times in direct accordance with the speed of the shaft 18 and, accordingly, the speed of the crankshaft 12 and the engine in general. In accordance with the practices of the present invention, however, and as best illustrated in Figs. 2, 3 and 4, the fan is rotatably mounted upon the shaft 18.

The fan 30 proper includes a cylindrical hub shell 32 rotatably mounted upon the outer end of the shaft 18 by means of a pair of spaced bearing elements 34 interposed between the inner walls of the hub 32 and the exterior surface of the shaft 18. The bearing elements 34 may be of any suitable type or construction in accordance with the present invention, but are preferably of the ball type as illustrated. A cup-shaped member 36, which serves as an armature, is centrally piloted upon the forward end of the hub shell 32 and suitably fixed with respect thereto, as by welding or the like, the side walls of the cup being directed rearwardly of the shaft 18 in concentric relation with respect thereof. A plurality of fan blades 38 are arranged radially of the member 36 with the shank ends thereof fixed with respect to the member as by rivets 40 or the like. The side walls of the armature 36 are formed of magnetic material to provide a plurality of fingers or segments 44 resiliently supported from the bottom or end portion of the armature for yielding movement in a radial direction. While this yielding or resilient mounting may include separately formed leaf springs, or the like, for the purpose of simplicity and economy, the fingers or segments 44 are preferably formed integrally with the remainder of the armature by slotting the side walls thereof at equal angular intervals in a direction parallel to the axis of the armature and, where necessary, reducing the thickness of the fingers or segments adjacent their point of connection with the remainder of the armature, as at 46, so as to allow the fingers or segments to more readily yield under the influence of centrifugal forces. In such case the entire armature 36 will be formed of magnetic material. Although not necessary to the proper functioning of the present invention in the broader sense, the peripheral surface of the combined thinned connecting portions 46 are machined to provide a plurality of axially adjacent annular grooves 48, the purpose of which will be described later.

A wear ring or washer 50 is preferably provided on the shaft 18 between the rear face of the hub of the pulley 22 and the forward face of the housing for the pump 14. The pulley 22 is provided with a forwardly projecting elongated hub portion 52 adapted to bear against the rear bearing 34 thereby to limit movement of the fan 30 rearwardly with respect to the shaft 18. A washer 54 fixed with respect to the forward end of the shaft 18 by means of a screw 56 radially overlaps the forward face of the inner race of the forward bearing 34 and thereby limits forward movement of the fan 30 with respect to the shaft 18. A suitable cap element 58 arranged in fluid tight relation with respect to the forward end of the hub shell 32 seals the interior of the same against the escape of lubricant from the forward end thereof.

Received upon the forwardly projecting hub 52 of the pulley 22 in concentric relation therewith and fixed against relative rotation with respect thereto, as by means of a press fit, is a magnetic rotor element indicated generally at 60. This rotor element 60 comprises a hub portion 62 and an equal number of equally angularly spaced salient poles 64 of alternately opposite polarity and the outer end surfaces of which extend into relatively close but slightly spaced relationship with respect to the inner surfaces of the fingers or segments 44 of the armature 36 when the device is at rest. The outer ends of the poles 64 are shaped to generally conform to the cylindrical curvature of the inner walls of the segments 44 and so as to provide a substantially uniform air gap between the ends of the poles 64 and the inner surfaces of such segments. The rotor 60 and particularly the poles 64 thereof is formed of permanently magnetized material. In order to prevent the magnetic attraction of the poles 64 from bending the outer ends of the fingers 44 into contact therewith a cylindrical spacer member 66 of non-magnetic material is fixed to the rear end of the hub shell 32 in adjacent relationship with respect to the forward face of the rotor 60 and its outer diameter is substantially equal to the inner diameter of the side walls of the armature 36 so as to abut against the inner faces of the various fingers 44 and thus serve as a stop for the fingers against inward flexing movement from their normal inoperative position.

With the construction as thus described, it will be apparent that with rotation of the shaft 18 and consequently the magnetic rotor 60, magnetic lines of force extending between the ends of adjacent pole pieces 64 will cut through the cooperating fingers or segments 44 of the armature 36 with the result that the armature will tend to rotate in the same direction and at the same speed as the rotor 60. It will be recognized that the action in this respect is similar to that of an induction motor in which the rotor is caused to turn due to the influence of a rotating magnetic field.

With the construction as thus far described, and assuming that the shaft 18 is at rest with the parts in the relation illustrated in Fig. 3, if now rotation is imparted to the shaft 18 and the speed of rotation gradually increases, as the shaft 18 and consequently the rotor 60 rotates therewith, the magnetic attraction of the rotor 60 on the armature 36 will cause the armature 36 and consequently the entire fan 30 to rotate therewith at substantially the same speed of rotation. As the speed of rotation of the shaft 18 and consequently the armature 36 increases, the centrifugal force acting upon the various fingers or segments 44 will tend to bend such fingers or segments and move the outer ends thereof radially outwardly away from the ends of the various poles 64, as illustrated in Fig. 4. The particular speed of rotation at which actual movement of the outer ends of the fingers or segments 44 actually becomes material will, of course, depend upon a number of different factors such as the relative mass of the fingers 44, the relative yieldability of the material from which the portions 46 are formed, the relative thickness of the portion 46, etc. is well appreciated by those skilled in the art.

In any event it will be appreciated that in accordance with the purposes of the particular embodiment of the invention shown, the construction will be so designed and arranged that no material separation of the outer ends of the fingers or segments 44 from the outer ends of the pole pieces 64 will occur until the speed of rotation of the fan 30 approaches that speed of the engine 10 which, when the corresponding vehicle is in direct drive, will produce a sufficient flow of air through the radiator 16 to eliminate the necessity of operating the fan 30. When such speed of the engine and consequently the fan 30 is reached and exceeded, the centrifugal force acting upon the various fingers or segments 44 will cause the outer ends of the fingers or segments to move outwardly away from the outer ends of the pole pieces 64 and increase the air gap existing therebetween, thus reducing the number of lines of force between the pole pieces 64 which are cut by the various fingers or segments 44 and thereby reduce the magnetic attraction between the armature 36 and rotor 60. Inasmuch as the power required to drive a fan such as the fan 30 increases as the cube of the speed of the fan, and inasmuch as the magnetic attraction between the rotor and the armature materially decreases upon increase in the air gap between them, it will be apparent that the ultimate result of the construction is that once the desired speed of rotation of the fan 30 is reached, the device will automatically, by reason of the increased resistance to rotation of the fan 30 and decreased magnetic drag between the armature and rotor, maintain the fan 30 at a substantial constant rate of rotation, the fingers of segments 44 floating radially with variations in the speed of rotation of the engine above the desired predetermined speed thereof to maintain a substantially constant power input to the fan. Thus with the construction described, the fan 30 is substantially incapable of being driven above a desired predetermined speed and the power input to the fan necessarily derived from the engine is necessarily limited and prevented from exceeding a predetermined maximum. The additional power which would otherwise be required to rotate the fan at speeds in excess of that predetermined by the arrangement described is, therefore, available in the engine for the purpose of driving the vehicle of which it forms a part and, furthermore, the fan 30 is prevented from rotating at such high rotational speeds as would create a sound disturbing to the occupants of the vehicle.

In order to provide a readily adjustable means for varying the maximum speed at which the fan 30 will normally rotate under the conditions explained, a garter spring such as 68 may be arranged under tension in any one of the grooves 48. The garter spring 68 thus acts to resiliently oppose radial expansion of the various fingers or segments 44 and its effect in this respect may be varied by shifting it axially from one groove 48 to another. Its restricting action to expanding movements of the fingers or segments 44 obviously being greater the nearer it is moved toward the open end of the cup-shaped armature 36.

Referring now to Fig. 5 a modified form of construction is shown in which a slightly different effect is obtained. Although the parts illustrated in Fig. 5 are not identical to those illustrated in the preceding views, they are in the main similar and, accordingly, similar parts are indicated by the same numerals as in the preceding figures except that such numerals bear a prime mark, and no detailed explanation of the various elements will be necessary as a result.

In the construction illustrated in Fig. 5 the hub shell 32' for the fan indicated generally at 30' is mounted upon the outer end of the shaft 18' by bearings 34' in the same general manner as illustrated in the previous figures. In this case, however, the forward end of the hub shell 32' is provided with a radial flange 70 to which the fan blades 38 are suitably secured by rivets 40'. The permanently magnetized rotor 60' in this case is relatively non-rotatably mounted upon the hub shell 32' in concentric relation with respect thereto. The drive pulley 22' is of slightly different construction from the drive pulley 22 previously described and in this case a spacer member or collar 72 surrounding the shaft 18' serves to accurately space the pulley 22' from the rear bearing 34' for the hub shell 32', the spacer 72 carrying the disc-like stop member 66' formed from non-magnetic material and serving the same purpose as the disc 56 in the preceding views in that it controls the minimum air gap between the fingers or segments 44' of the armature 36' and the outer ends of the poles 64' of the rotor 60'. In this case the cup-shaped armature 36' is non-rotatably secured to the drive pulley 22' in concentric relation with respect to the shaft 18' by means of rivets 74.

It will be appreciated that the construction illustrated in Fig. 5 is primarily a reversal in the position of the armature and rotor, the armature in this case being positively driven and the rotor being magnetically driven therefrom. There is a difference in the effect of this reversal in that the armature 36' in being positively driven from the shaft 18' is subjected to greater centrifugal forces than in the first described construction and, consequently, it is possible in this construction to provide a greater air gap between the fingers or segments 44 and the ends of the poles 64' at higher engine speeds, the effect of this difference being that once the speed of the shaft 18 has increased to that speed at which it is desired to limit further rotational speed of the fan 30', the speed of the fan 30' will then decrease as the speed of the shaft 18' increases instead of rotating at a substantially predetermined maximum speed as will be the case in the construction first described. In either event, however, it will be appreciated that the constructions described provide a drive for the fan 30 amply effective for the purpose desired over those ranges of speed where operation of the fan is necessary and eliminates the useless expenditure of power in driving the fan under circumstances where rotation of the fan is unnecessary because of the natural flow of air through the radiator. The construction further results in the elimination of the objectionable noises developed by such fans rotating at unnecessarily high speed and permits the use of smaller driving belts, such as the belt 24, as well as resulting in a construction in which the life of operation of the belt is materially increased.

Formal changes may be made in the specific embodiment of the invention described without departing from the spirit or substance of the broad invention, the scope of which is commensurate with the appended claim.

What is claimed is:

In a fan drive for a motor vehicle in which an internal combustion engine adapted to be operated at a wide range of speeds during normal operation and in which a liquid circulation system including a radiator are provided, and in which a rotatable fan for effecting a flow of air through said radiator is associated with the engine, whereby air also flows through said radiator upon motion of said vehicle, the combination with means for driving said fan comprising, a first member driven at a speed proportional at all times to the speed of rotation of said engine, a second member rotatable at all times in direct proportion to the speed of rotation of said fan arranged in approximately aligned relation to said first member and rotatable relative thereto, a multipolar permanent magnet fixed for rotation with one of said members, and a magnetically attractable member arranged in peripherally enclosing relation with respect to said magnet fixed for rotation with the other of said members and free to rotate independently of said magnet except for the magnetic drag of said magnet existing therebetween, whereby said fan is constantly urged toward proportional rotation with said engine, the construction and arrangement of said magnet, said magnetically attractable member and said fan being such that a material and increasing amount of slippage occurs in said drive between said magnet and magnetically attractable member when said engine is rotated at increasing speeds of rotation materially in excess of predetermined lower speeds of rotation.

FRANK O. GRAHAM.